(12) United States Patent
Aronsson et al.

(10) Patent No.: US 8,186,762 B2
(45) Date of Patent: May 29, 2012

(54) CUTTING TROLLEY WITH A FRONT AND A REAR ATTACHMENT DEVICE

(75) Inventors: Tore Aronsson, Mölndal (SE); Rolf Johansson, Glumslöv (SE); Thomas Pallin, Sävedalen (SE)

(73) Assignee: Husqvarna AB, Huskvarna (SE)

( * ) Notice: Subject to any disclaimer, the term of this patent is extended or adjusted under 35 U.S.C. 154(b) by 478 days.

(21) Appl. No.: 12/440,215

(22) PCT Filed: Sep. 6, 2006

(86) PCT No.: PCT/SE2006/001023
§ 371 (c)(1),
(2), (4) Date: May 13, 2009

(87) PCT Pub. No.: WO2008/030147
PCT Pub. Date: Mar. 13, 2008

(65) Prior Publication Data
US 2010/0180453 A1  Jul. 22, 2010

(51) Int. Cl.
*B63D 1/04* (2006.01)
(52) U.S. Cl. .......................................... 299/39.3
(58) Field of Classification Search .............. 299/39.3, 299/39.6, 36.1; 451/340, 344; *E21C 25/16, E21C 25/18*
See application file for complete search history.

(56) References Cited

U.S. PATENT DOCUMENTS

| 6,349,712 B1 | 2/2002 | Halstead | |
|---|---|---|---|
| 6,478,666 B1 * | 11/2002 | Berger et al. | 451/344 |
| 7,080,851 B2 * | 7/2006 | Schipper | 451/344 |

FOREIGN PATENT DOCUMENTS

| DE | 19820029 A1 | 11/1999 |
|---|---|---|
| DE | 19839341 A1 | 3/2000 |
| DE | 20304278 U1 | 7/2003 |
| EP | 0006788 A2 | 1/1980 |
| EP | 1714740 A1 | 10/2006 |
| GB | 2410206 A | 7/2005 |

* cited by examiner

*Primary Examiner* — John Kreck
(74) *Attorney, Agent, or Firm* — Novak Druce + Quigg LLP

(57) ABSTRACT

A cutting trolley having a frame structure and at least two rear wheels on a rear shaft and at least one front wheel, for a cutter of the type that includes a front handle, a rear handle, and a circular cutting blade in the front end of the cutter. The trolley also includes a cutter carrier having a front attachment device and a rear attachment device for the attachment of a cutter on the carrier via a front handle and a rear handle of the cutter, respectively, for trolley carried operation of a cutter. The cutting trolley has an adjustment means, as part of a displacement device, that can adjust the position of the cutter carrier and hence the cutter and the cutting blade for alignment control and/or curve cutting adjustment, such that the adjustment is possible without interrupting the cutting operation.

12 Claims, 10 Drawing Sheets

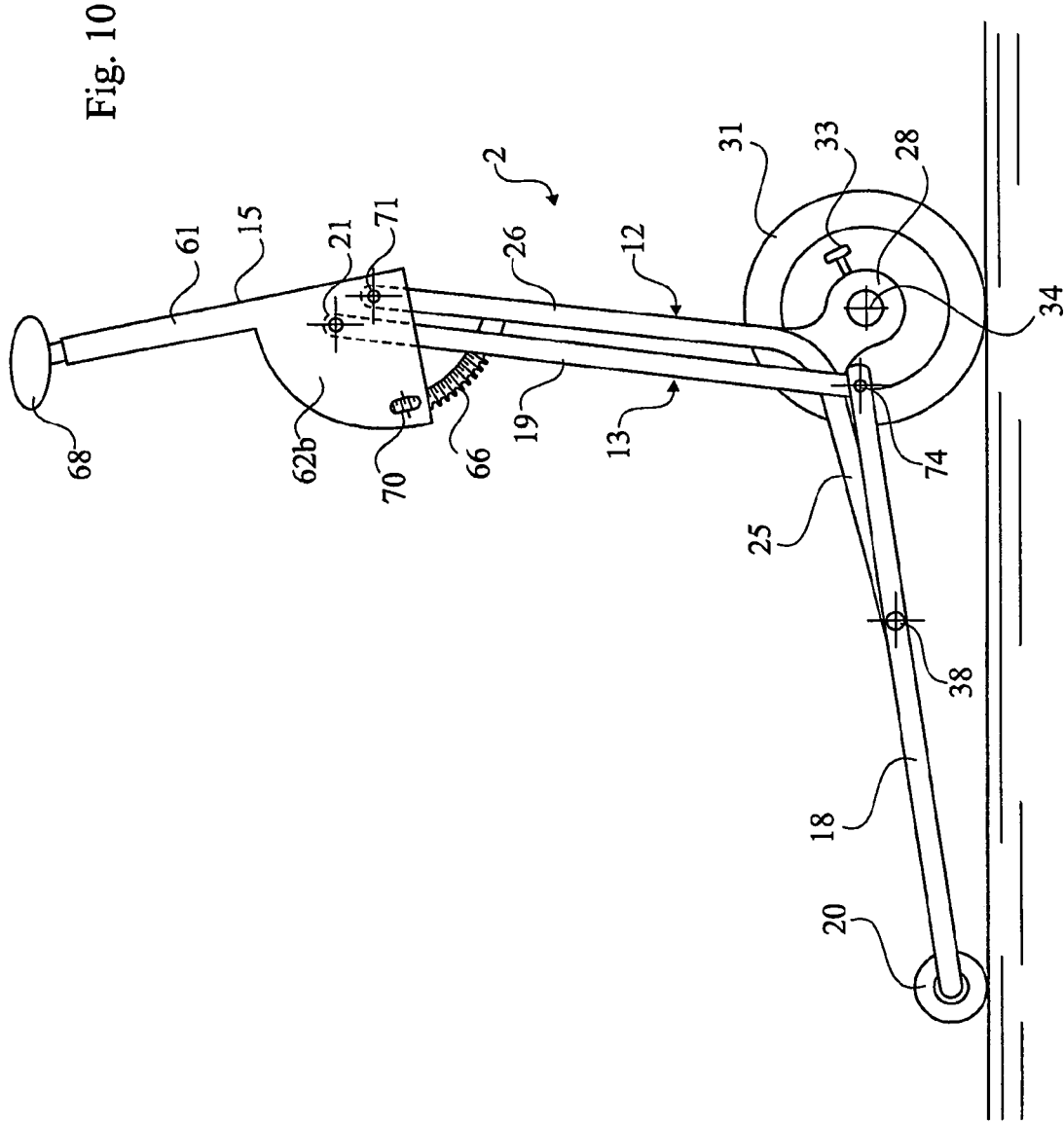

CUTTING TROLLEY WITH A FRONT AND A REAR ATTACHMENT DEVICE

TECHNICAL FIELD

The present invention relates to a cutting trolley with a frame structure and at least two rear wheels on a rear shaft and at least one front wheel, for a cutter of the type including a circular cutting blade in a front end of the cutter, a front handle and a rear handle.

BACKGROUND OF THE INVENTION

Cutters of the above mentioned type are normally hand-operated. Sawing in asphalt and concrete floors with such hand-operated cutters, which also are referred to as power cutters or cutting machines, however is a difficult task not the least from an ergonomical point of view. Therefore, trolleys have been designed and are conventionally used for carrying the cutter during the performance of that type of work. The combination of a cutting machine which basically is intended for manual operation of the cutter, and a trolley for such machine, however, gives rise to new problems. One such problem is due to the fact that the front and rear handles of cutting machines designed for manual operation conventionally are connected to the machine body via anti-vibration means. Therefore, alignment problems can arise when using the trolley and the cutter in combination, such that the direction of the groove established by the cutting blade will deviate from the direction of movement of the trolley. Further, there is a long felt want to provide a cutting trolley which allows the provision of a more easily controlled sawing depth than has been possible with cutting trolleys used today.

BRIEF DISCLOSURE OF THE INVENTION

It is the purpose of the present invention to provide an improved cutting trolley of the type mentioned in the preamble. More particularly it is a purpose to address one or all of the problems mentioned above and/or in the following. This task may be satisfied if the cutting trolley is designed according to the appending claims. Further characteristic features and aspects of the invention will be apparent from the following detailed description of a preferred embodiment of the cutting trolley of the invention.

BRIEF DESCRIPTION OF DRAWINGS

In the following description of a preferred embodiment, reference will be made to the accompanying drawings, in which.

DESCRIPTION OF A PREFERRED EMBODIMENT

Figure 1:
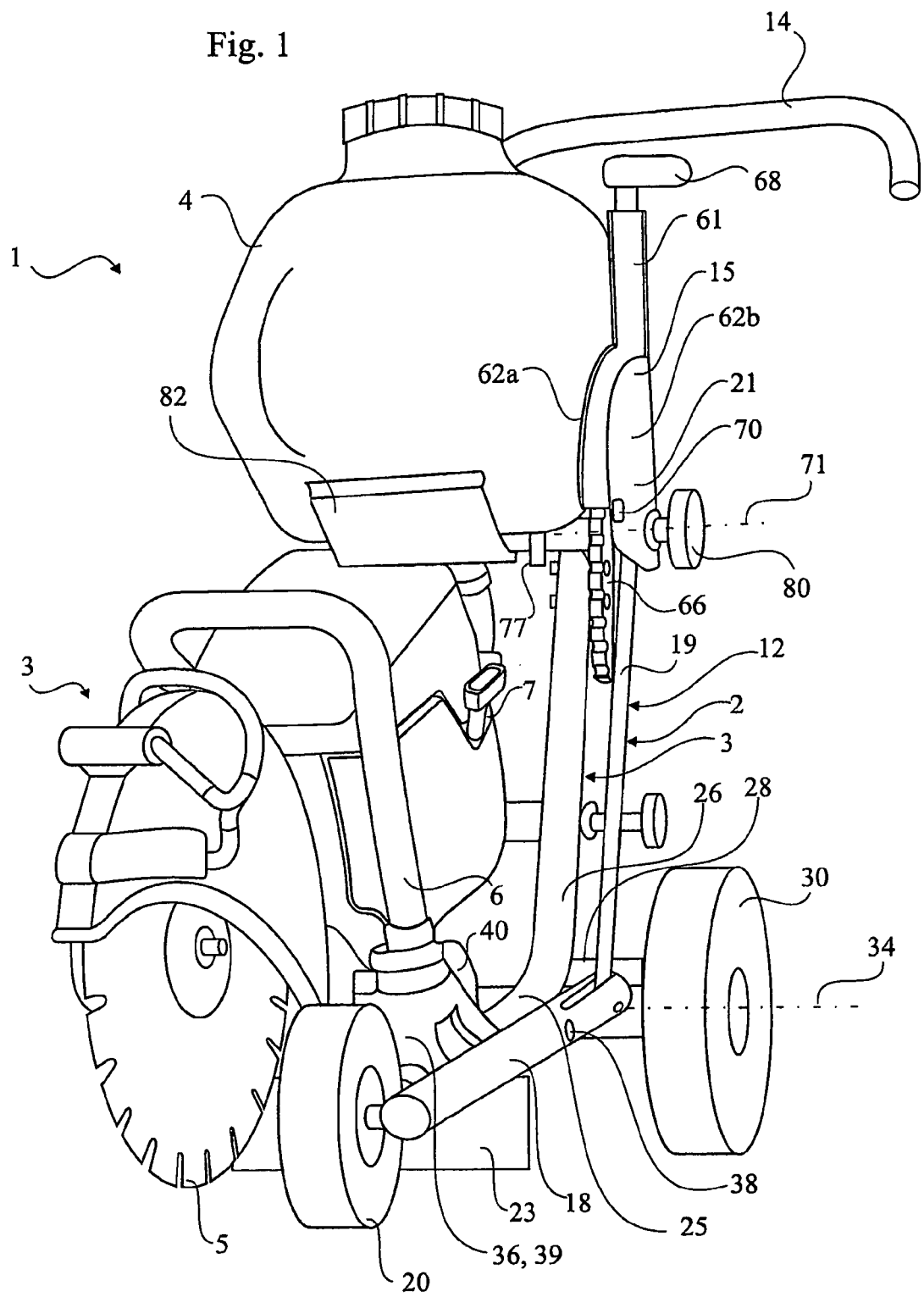
FIG. 1 is a perspective view of an assembly, including the cutting trolley with a mounted cutter and a water tank, showing the front and left hand side of the assembly.
Figure 2:
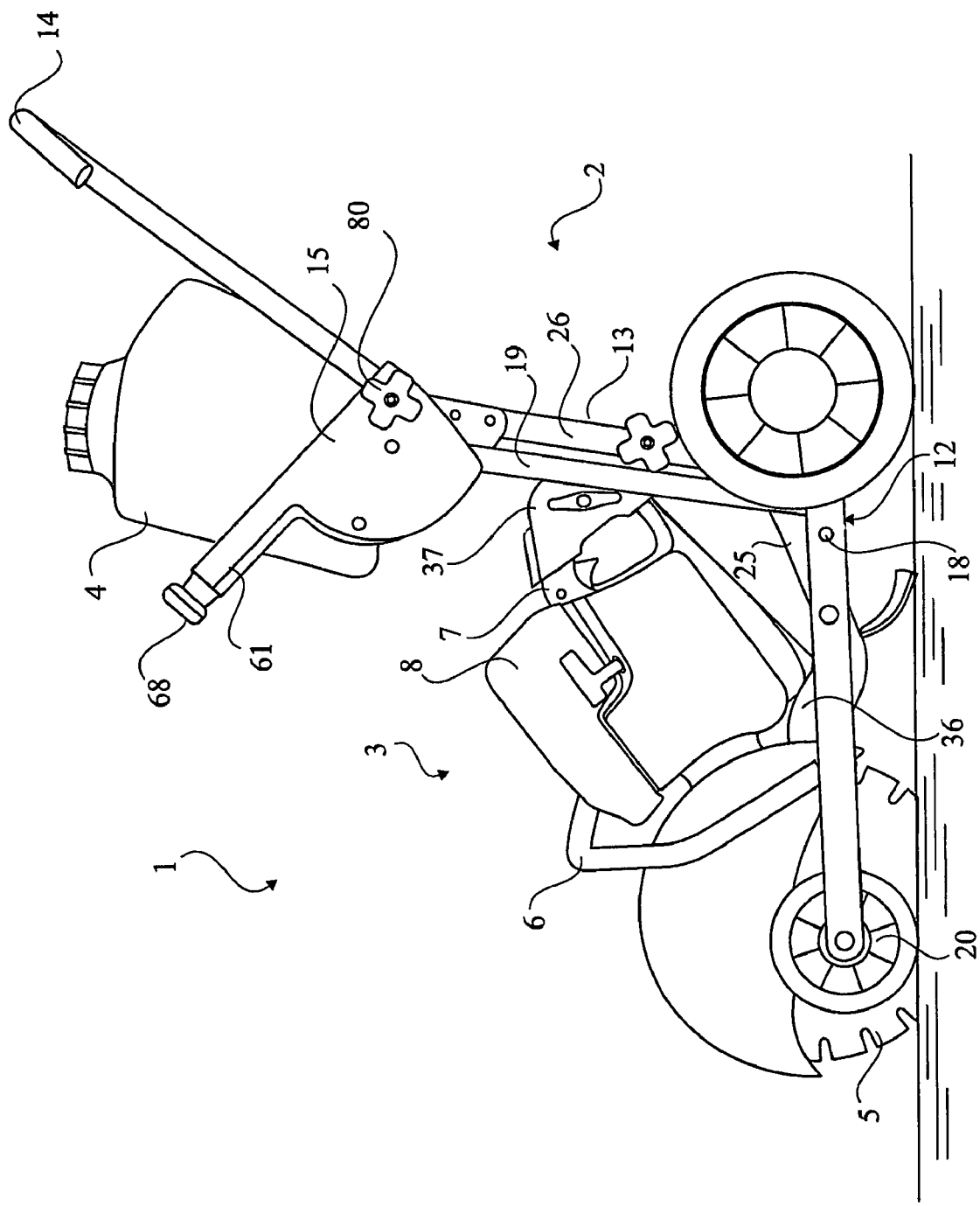
FIG. 2 shows the cutting trolley and the cutter from the left, the cutter sawing in a floor or the like, FIG. 3 shows the cutting trolley and the cutter ready for transportation.

With reference first to FIGS. 1 and 2, a complete assembly consisting of a cutting trolley 2, a cutter 3 and a water tank 4 is generally designated 1. The cutter 3 is a petrol-powered cutter of a type known per se, which per se does not form part of the invention. It includes a rotational, diamond-equipped cutting blade 5 in its front end. In FIG. 1 and FIG. 2 it is mounted on the cutting trolley 2 for easy cutting in asphalt, a concrete floor, or the like. Normally, however, it is hand-held and manually operated and is for that purpose provided with a front handle 6 and a rear handle 7. Both handles are attached to the machine body 8 of the cutter 3 via anti-vibration devices, which provide a considerable flexibility of the handles relative to the machine body and hence also to the cutting blade 5 and vice versa.

The cutting trolley 2 has two main units, namely a first unit referred in this text as frame structure 12, and a second unit referred to as cutter carrier 13. Other features of the trolley includes a handle 14 for pulling the trolley 2 forwards or rearwards, and a control device, general designated 15 for control and adjustment of the sawing depth.

The said first main unit referred to as frame structure 12 includes a first link 18 and a second link 19. A single front wheel 20 is mounted in a front end of the first link 18. The first link 18 is elongated and horizontal or forms a small angle to the horizontal plane depending on the sawing depth. In view of the comparatively small angle of inclination, which can be adjusted as will be described in the following, the first link can be referred to as generally horizontal. From the same reason the second link 19 can be described as generally vertical, although it can be inclined as well in a controlled manner with reference to a vertical plane as also will be explained in the following. A lower end of the second link 19 is pivotally connected to a rear end of the first link 18. A top end of the second link 19 is connected via a pivot 21 to said device 15 for control of the sawing depth.

Figure 4:
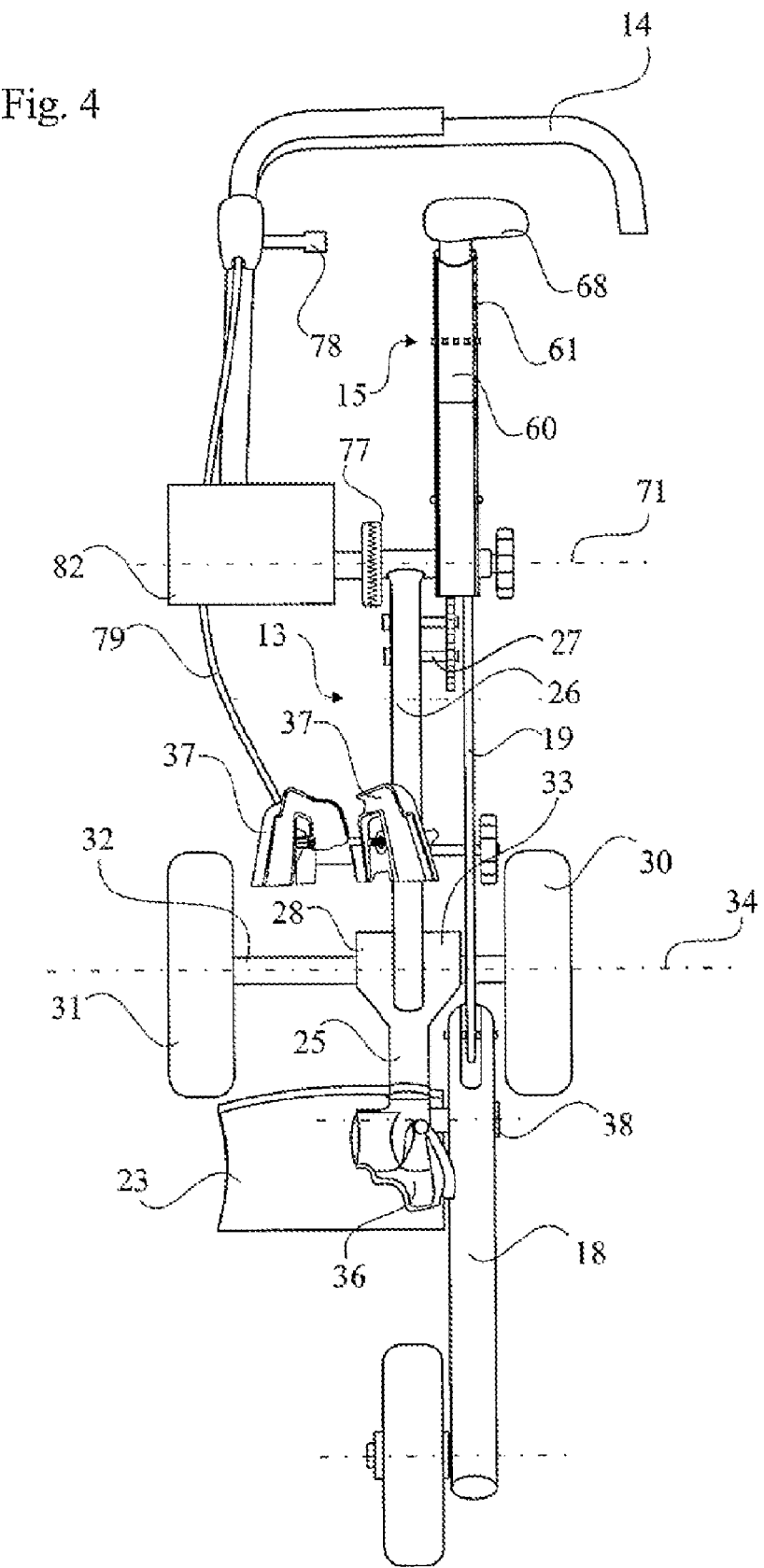
FIG. 4 is a schematical front view of the trolley.

The said second main unit referred to as cutter carrier 13 basically consists of a dog-leg shaped tube structure including a front, lower section 25, and a rear upper section 26. An end portion of said lower section 25 of the cutter carrier 13 is rotationally connected to said first link 18 of the frame structure 12 in a position of said first link between the front wheel 20 and the rear end of the first link 18. The end of said rear, upper section 26 of the cutter carrier 13 is connected to an upper horizontal shaft 27, which has the shape of a sleeve of short length, FIG. 4. The cutter carrier 13 is provided with a bearing housing 28 in the region of the bend of the dog-leg shaped tube structure constituting said cutter carrier 13. The trolley 2 has two rear wheels 30, 31 preferably arranged in the respective ends of a horizontal wheel shaft 32 which is journalled in said bearing housing 28. The centre of rotation 34 of the rear wheels 30, 31 defines a centre of turning the cutter carrier 13. If the cutter blade 5 shall be lowered, the cutter carrier is tilted forwards about said axis of rotation 34 of the rear wheels, and is vice versa raised to a more upraised position if the cutting blade shall be raised to a higher lever, as will be explained in the following.

The wheel shaft 32 can be fixed in chosen positions relative to the cutter carrier 13 by means of a locking screw 33. The locking screw can be undone, allowing the wheel shaft 32 and the wheels 30, 31 to be laterally displaced relative to the cutter carrier 13 and locked in any new position.

Figure 7:
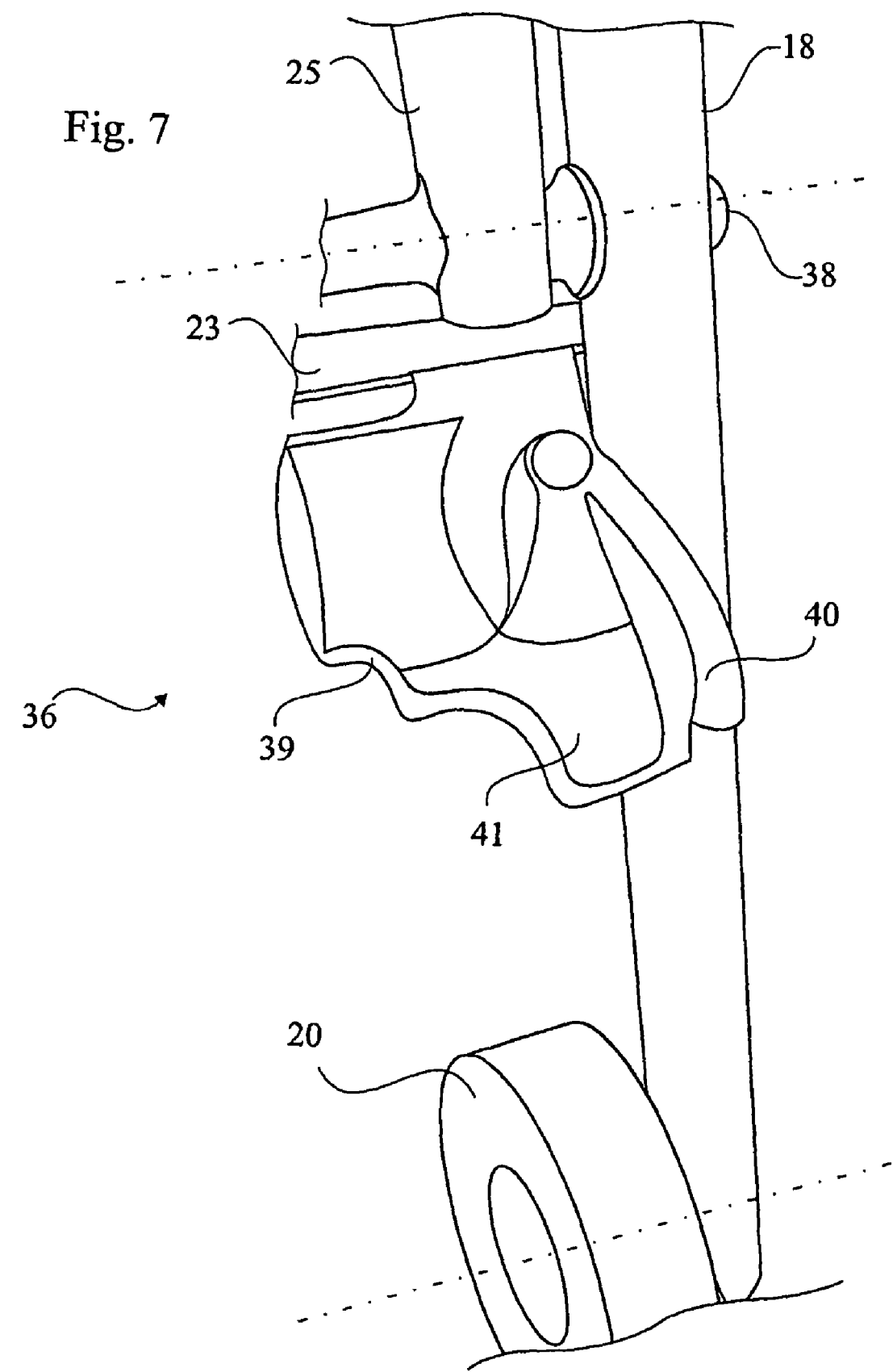
FIG. 7 shows a front attachment device for the attachment of the cutter.

A front attachment device 36 and a rear attachment device 37 are provided for the attachment of the cutter 3 on the cutter carrier 13 via the front handle 6 and the rear handle 7 of the cutter 3, respectively. The front attachment device 36 is shown in its non-locking position at a large scale in FIG. 7. The front attachment device 36 is mounted on the front lower section 25 of the cutter carrier behind a splash apron 23 at the front end of said section 25 in front of the position of a front pivot 38 which is a member for rotational connection of the front lower section 25 of the cutter carrier 13 to said first link 18 of the frame structure 12. The attachment device 36 consists of a bracket 39, which is fixedly secured to the front end of said front section 25 of the cutter carrier, and a turnable locking member, in this text referred to as latch 40. The bracket 39 has a concave, curved bottom portion 41 fitting the shape of a lower section of a front, curved section of the front handle 6 of the cutter 3. When the front handle 6 has been positioned on the bracket 39, the latch 40, FIG. 7, is turned to locking position over the front handle 6 resting on the curved bottom portion 41 of the bracket 39. When the curved bottom portion of the front handle 6 is secured between the bracket 39 and the latch 40, the curved design of the bottom portion 41 of the attachment device allows the curved section of the front handle 6 of the cutter 3 to be slightly turned in the front attachment device 36, which also allows the entire cutter 3 to be slightly turned, as will be explained in the following, for alignment control and/or curve cutting adjustment of the cutting blade 5. An alternative to this control would be to make the wheel shaft 32 steerable.

Figure 9:
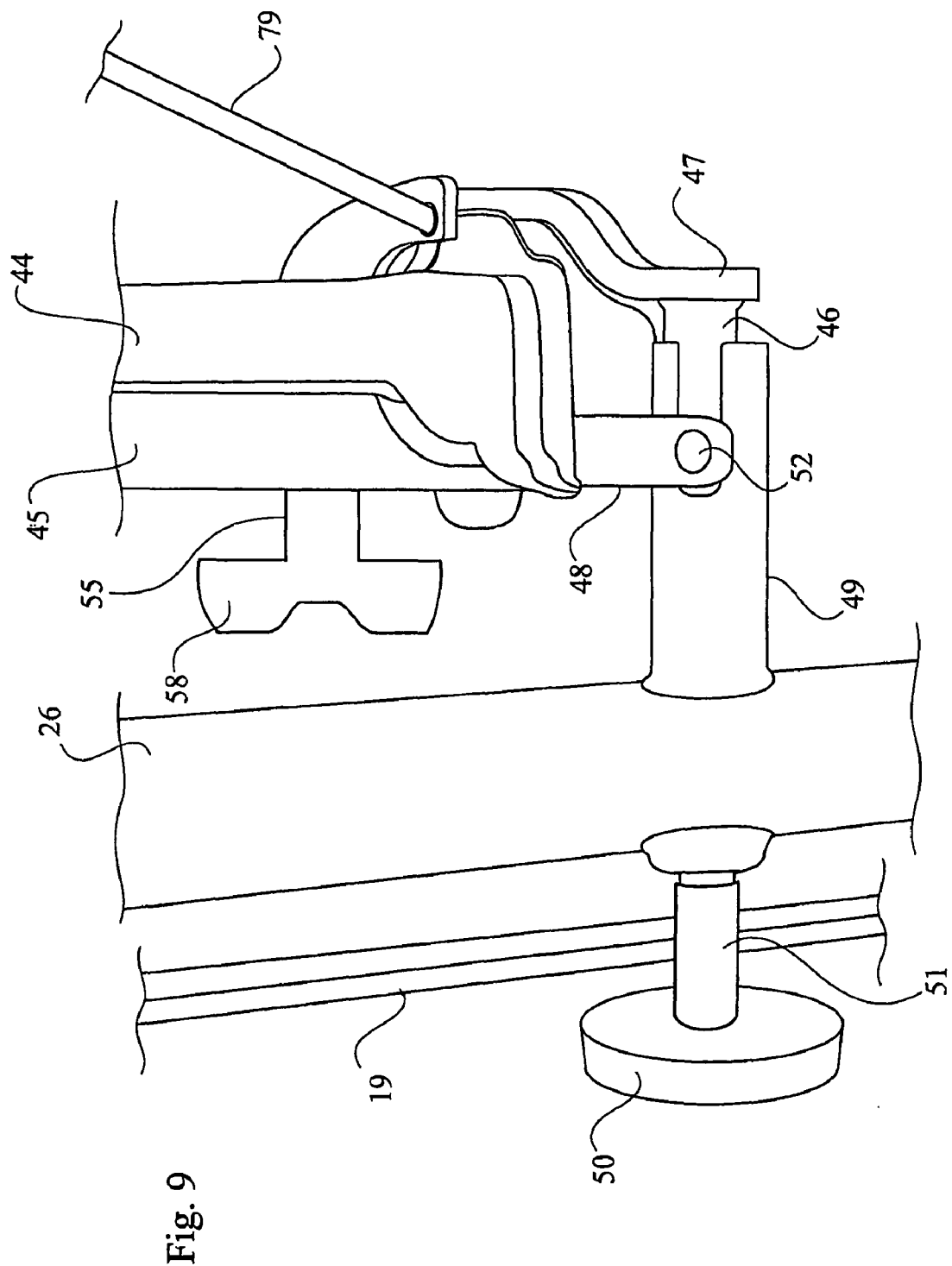
FIG. 9 shows a device for lateral displacement of the rear attachment member for alignment control and/or curve cutting adjustment of the cutting blade, the rear handle of the cutter being clamped in said rear attachment device, and FIG. 10 schematically illustrates a linkage system including the said control device.

The rear attachment device 37 consists of two halves, namely a first or right hand half 44 and a second or left hand half 45. The halves 44, 45, FIG. 9, are secured to a rod-shaped slide 46 via holding members 47 and 48, respectively. The slide can move sideways, i.e. perpendicularly to the longitudinal direction of the cutter 3 and of the cutting blade 5 in a sleeve 49, which is mounted sideways on the rear, upper section 26 of the cutter carrier 13 in a position at a distance from the upper end of said upper section 26. The lateral displacements of the slide 46 is provided by means of a knob 50 on an adjusting screw 51.

Figure 5:
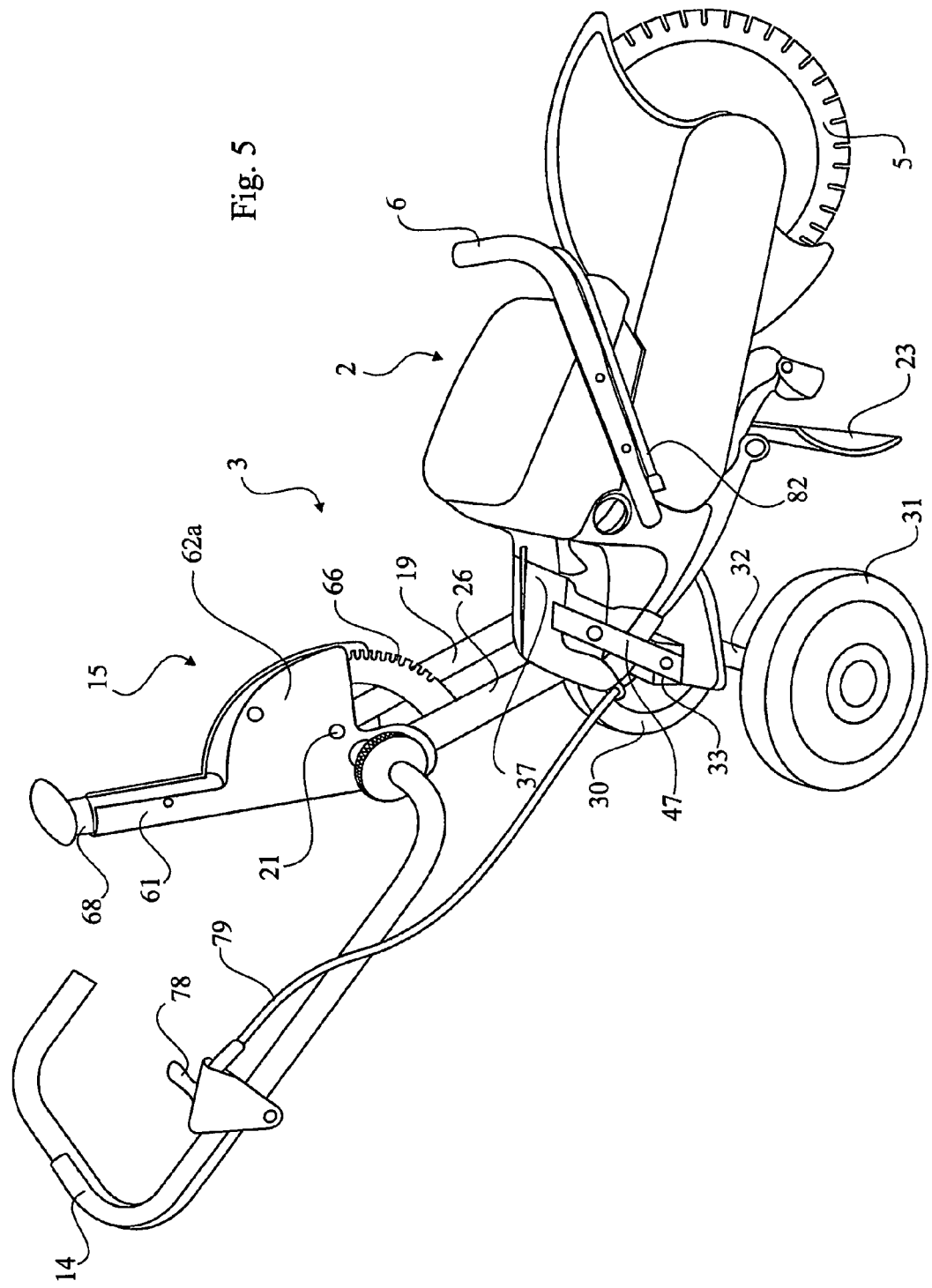
FIG. 5 is a perspective view showing the right hand side of the trolley and a cutter mounted on the trolley.
Figure 8:
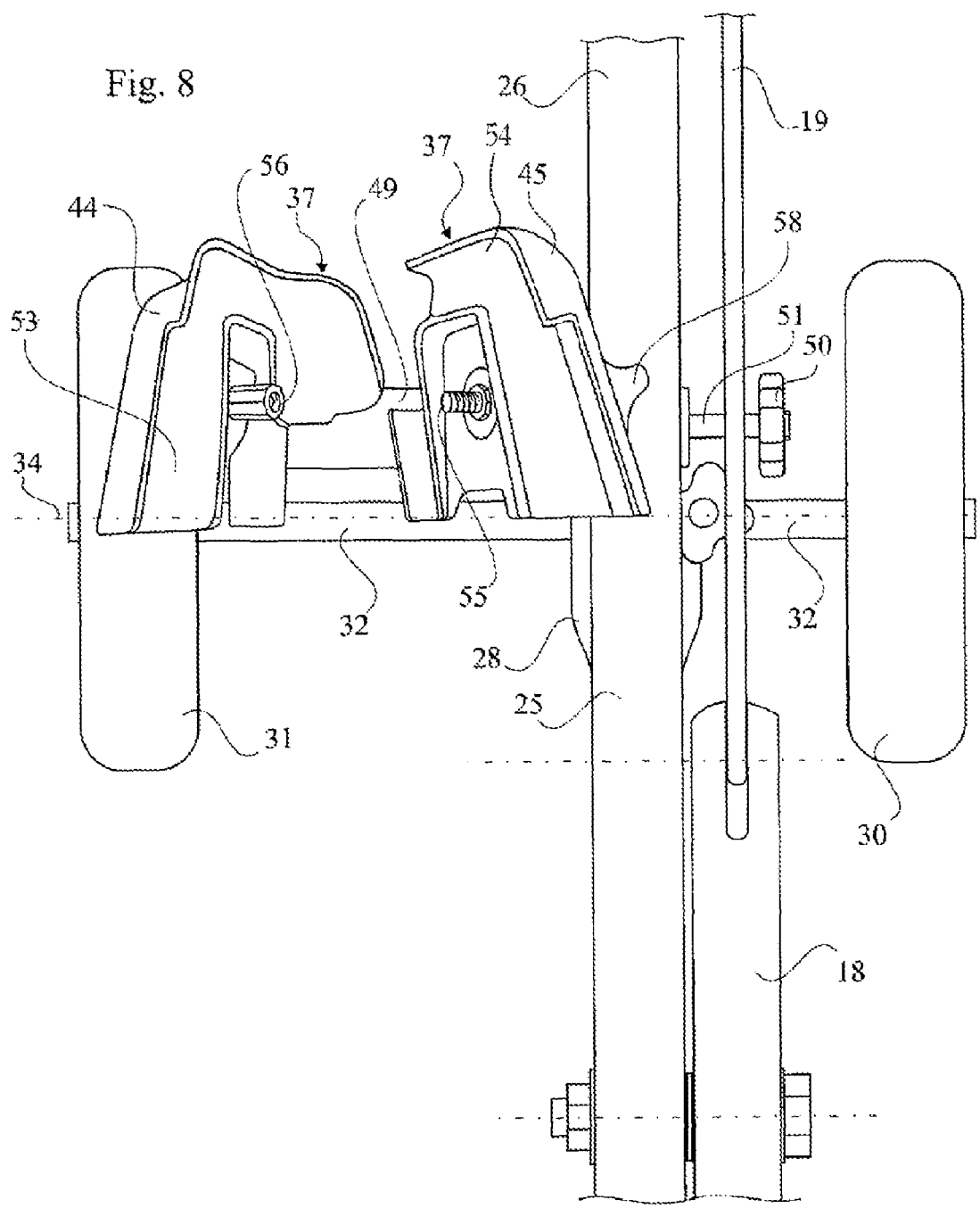
FIG. 8 shows a rear attachment device for the attachment of the cutter.

The first half 44 of the rear attachment device 37, which is secured by holder 47 to the slide 46, has a cavity 53 and the second half 45 has a cavity 54, FIG. 8. In combination, when the two halves 44 and 45 are clamped together, the cavities 53 and 54 define a space which is adapted to accommodate the rear part of the rear handle 7 of the cutter 3, FIG. 5, including a throttle trigger lockout (not shown) on the upper side of the rear handle 7, which throttle trigger lockout is permanently pressed down when the handle 7 is accommodated in the rear handle 7, clamped between the two halves 44 and 45. The two halves in their holding positions are clamped together by means of a locking screw 55, which extends through said second half 45, and a nut 56 on the holding member 47. The locking screw 55 can be tightened and undone by means of a handle 58. When the second half 45 is loosened, it can be folded aside, as is shown in FIG. 8. For that purpose said second half 45 and its holder 48 are connected to the slide 46 via a hinge 52.

By means of the adjusting screw 51, it is possible to displace the rear handle 7 in the lateral directions, when the handle is accommodated and clamped in the rear attachment device 37. When such lateral displacement is performed, the front handle 6 of the cutter 3, which is accommodated in the front attachment device 36, is slightly turned in said front attachment device, which is possible because of the curved design of the bottom portion 41 of the bracket 39. In the introductory part of this patent specification, it is mentioned that the front and rear handles of the cutter are connected to the machine body via anti vibration members which provide some flexibility to the connections, and that this may cause problems as far as the alignment of the cutting blade 5 is concerned. This is due to the fact that the direction of the groove which is cut by the cutting blade may be caused to deviate from the direction of movement of the cutting trolley 2. This is a well known problem in connection with cutting trolleys, which conventionally means that the cutting operation has to be interrupted, the position of the entire trolley be adjusted to a new position, and the cutting operation be restarted. When cutting with a machine of the present invention, however, this problem is readily and efficiently attended to by means of the adjustment screw 51 which can adjust the position of the cutter carrier and hence the cutter 3 and the cutting blade 5 for alignment control. The same adjusting members also can be employed for curve cutting adjustment.

Figure 6:
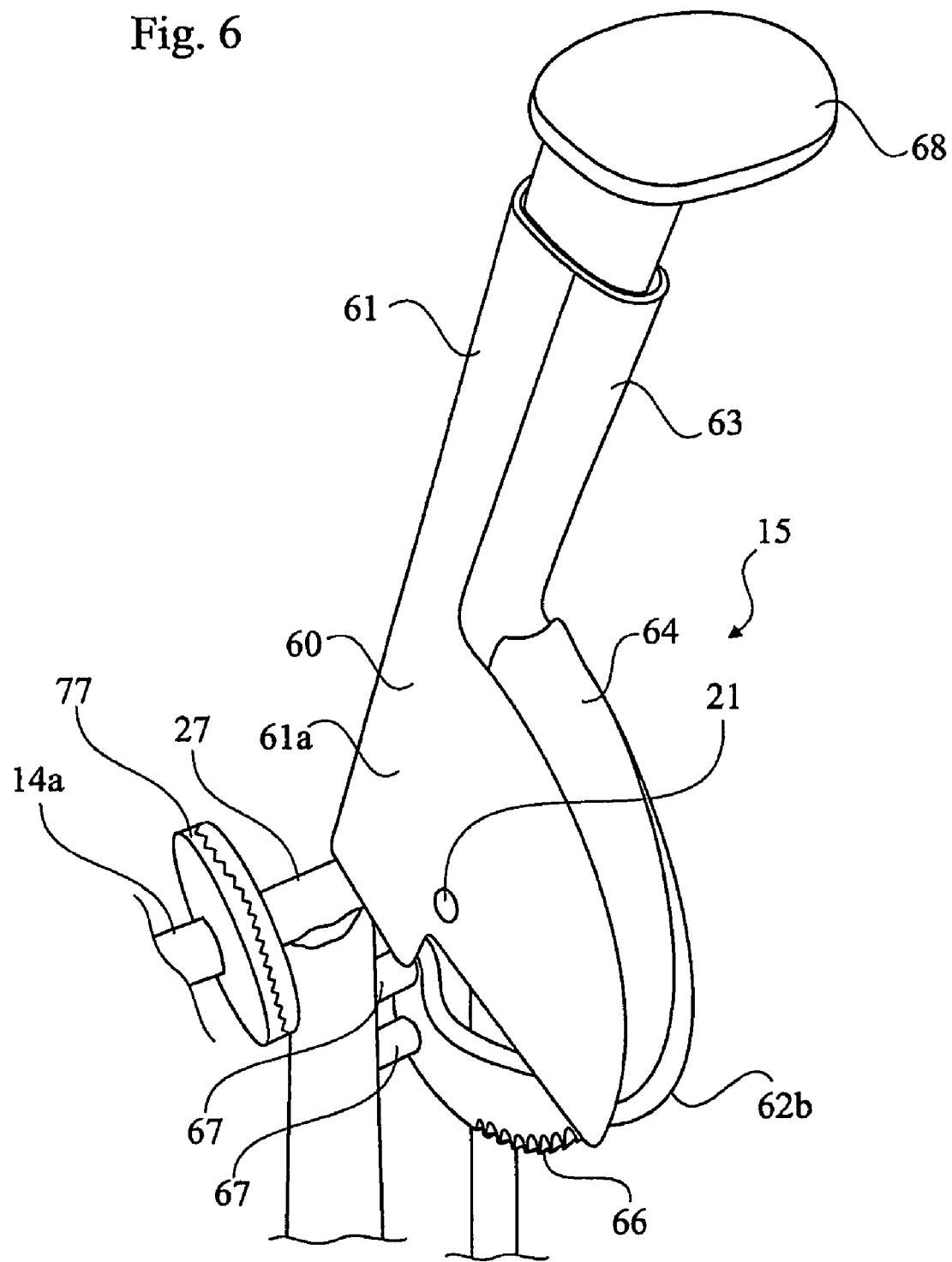
FIG. 6 is an enlarged, perspective view showing a device for controlling the sawing depth.

The control device 15 for adjusting the sawing depth now will be explained with reference also to FIG. 6. The control device includes a handspike, generally designated 60, which is located at a high level in the assembly 1, adjacent to the handle 14 for operating the trolley 2, on the left hand side of the assembly, which makes it easily accessible to the operator, making it possible to adjust the sawing depth during operation, even if the operator is moving the trolley forwards. On the same handle also a throttle grip 78 is provided, on the right hand side of the trolley. By means of the throttle grip 78 the operator can control the throttle via throttle wire 79. Further a device for adjusting the position/inclination of the handle 14 is provided, easily accessibly for the operator. This handle adjustment device includes a handle 80 on the left hand side of the control device 15 for turning a screw extending through the sleeve/shaft 27, which extends through the control device 15. Said screw is provided for engaging or disengaging a conventional clutch 77, which connects a lower part 14a of a tube member, the upper part of which constitutes the handle 14, to said sleeve/shaft 27 and hence to the trolley 2. All devices for controlling and/or for adjusting the cutting trolley and the cutter thus are provided easily accessible for the operator which is highly advantageous not the least from an ergonomic point of view.

The handspike 60 consists of a plate structure, which is designed and bent so as to provide an U-shaped bar 61 and two parallel panels 62a, 62b having the contour of a quarter of a circle. The bar 61, which has a U-shaped cross section, and the side panels 62 form integrated parts of the handspike 60. The bar 61 also includes a first cover 63 on the front side of the bar, so that the bar 61 is completed to form a tube. A second cover 64 is provided between the side panels 62 in the region of the circular periphery of the panels.

The pivot 21, mentioned in the foregoing includes a shaft extending through the side panels 62 of the handspike 60. Also the sleeve 27 extends through the handspike 60, which can be turned about said sleeve 27 by means of the bar 61. The centre of the sleeve 27 in other words forms a centre of rotation 71 of the handspike 60 as well as of the screw (not shown) for operating the clutch 77.

A section of a toothed ring 66 has a centre coinciding with the centre of rotation of the handspike 60 about the sleeve 27. An end of the toothed ring 66 is attached to the upper section 26 of the cutter carrier 13 via two studs 67 at a distance from the sleeve 27 and extends into the space between the panels 62, inside said second cover 64. In said space there is also provided a device for latching the handspike 60 in desired positions relative to the toothed ring 66, said latching device including a latch which can be engaged between any chosen teeth of the toothed ring 66 and also be released, allowing the handspike 60 to be turned to a new position. The said latching device is operated by a handle 68 in the end of the bar 61, releasing the latch via a lever which can be turned about a hinge 69, so that the handspike 60 can be turned to a new position, where the handspike is locked, in the new position, a return spring causing the handle 68 to return to its original position in the bar 61.

The position of the handspike 60 relative to the toothed ring 66 is indicated through one or a plurality of openings 70 in the left hand one of the panels 62. The position of the handspike, which corresponds to a certain sawing depth, as will be explained in the following, thus can be readily observed and controlled.

The described frame structure 12 and cutter carrier 13 in combination define a linkage system, illustrated in FIG. 10, which functions in the following way for achieving a desired sawing depth or for raising the cutting blade 5 to a position above the ground level. When the cutting blade 5 is positioned completely above the ground level, the operating bar 61 is in an upraised position, FIG. 1. If the cutting blade 5 shall be lowered for cutting at a certain depth, the operator moves the bar 61 and hence the entire handspike 60, including also the side panels 62a, 62b, forwards. This causes the two side panels 62a, 62b to turn about the centre of rotation 71 of the handspike, which defines a first lever included in the linkage system. The turning of the handspike 60 causes the shaft included in the pivot 21 to be turned downwards. The movement is transferred via the pivot 21 to said second link 19 included in the frame structure 12, causing the link 19 to be moved downwards. Said link 19 has the function of a push/pull-bar included in the linkage system. The pushing movement of the link 19 is transferred to said first link 18 of the frame structure via a pivot hinge 74 connecting the lower end of the second link 19 with the rear end of the first link 18, causing the rear end of said first link 18 to be lowered, turning the lever 18 slightly about the centre of rotation of the front wheel 20. The said downwards directed movement of the first link 18 is transferred to the front end portion of the front lower section 25 of the cutter carrier 13, via the front pivot 38, causing said front lower section 25 of the cutter carrier to be lowered. This in turn causes the entire cutter carrier 13 to be tilted, turning about the centre of rotation 34 of the rear wheels 30, 31 until the desired working depth of the cutting blade 5 is achieved, which can be observed and indicated by a corresponding digit or other symbol on the toothed ring section 66, which can be viewed in the opening 70. When the desired depth thus is achieved, FIG. 2, the handle 68 is released and returns by means of a return spring to its original position causing said latching device to lock the handspike 60 in the adopted position relative to the toothed ring section 66. When the cutting blade 5 shall be raised to a higher position, the control device 15 and the described linkage system is operated the other way around.

Figure 3:
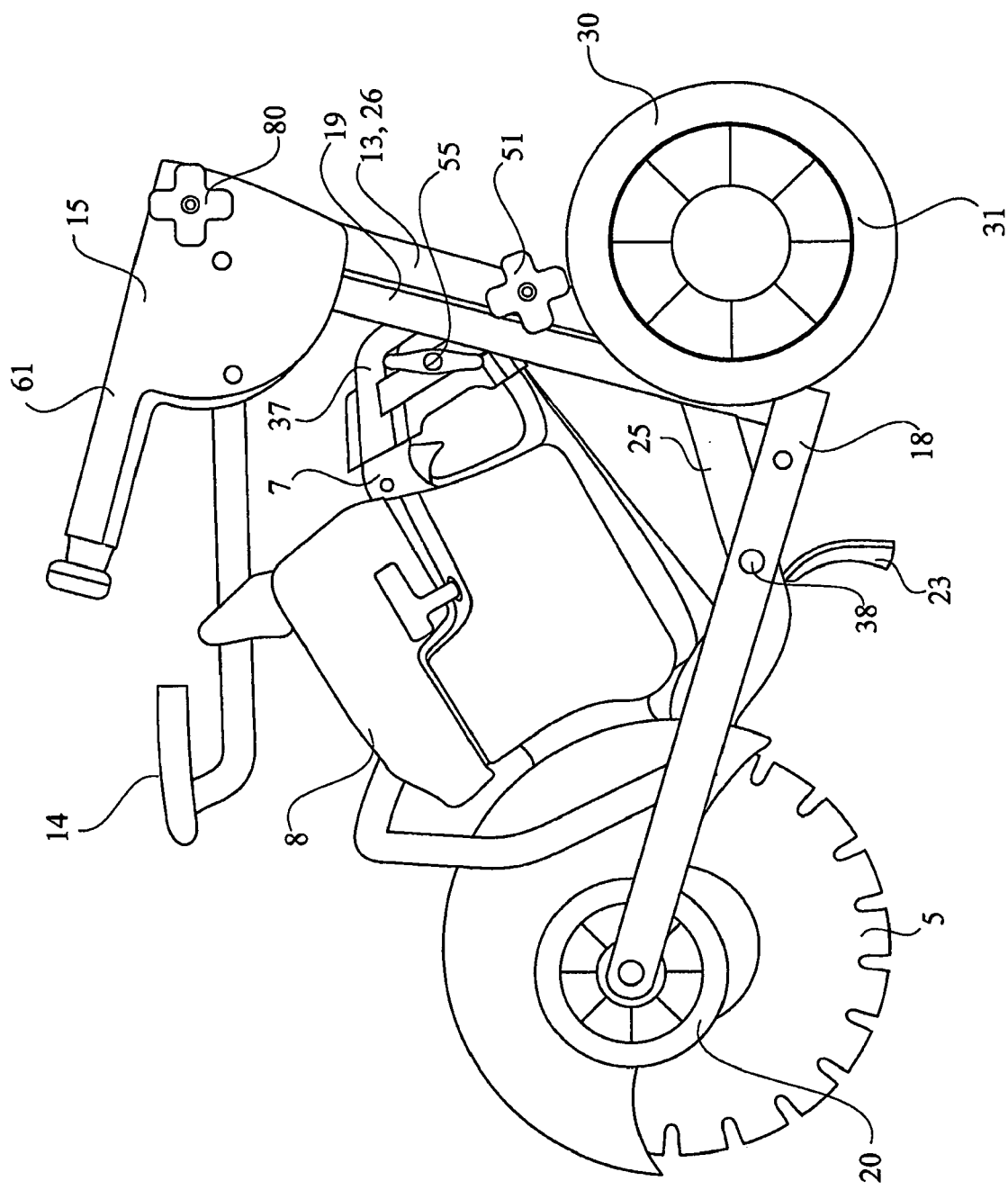

The cutter 3 is operated by the operator via a throttle grip 76 on the handle 14 in a mode which in principle is conventional and which therefore will not be described in any detail. The handle 14 is, as mentioned, connected to the sleeve/shaft 27 via a lower portion of the cube structure defining the handle 14 and the clutch 77. The clutch can be disengaged by means of the handle 80 and said screw extending through the sleeve/shaft 27, allowing the handle 14 to be turned forwards or rearwards, including turning forwards to a position shown in FIG. 3 for compacting the assembly. Before moving the handle to this foremost position, the water tank 4, resting on a shelf 82 on a lower part of the tube structure including the handle 14, for supplying cooling liquid to the saw blade via a water hose 79 is first removed.

The invention claimed is:

1. A cutting trolley with a frame structure comprising:
   at least two rear wheels on at least one rear shaft;
   at least one front wheel;
   a cutter carrier, said cutter carrier including a front attachment device and a rear attachment device for the attachment of a cutter on the carrier via a front handle and a rear handle of the cutter;
   said frame structure including
      a first lower, elongated link, wherein said at least one front wheel being mounted in a front end of said first link;
      a second rear link which is rotationally connected to a rear end of said first link, said second link extending from said lower end up to a control device for adjusting the sawing depth of the cutting blade, wherein said control device being positioned at a higher level than the cutter carrier; and
      a linkage system wherein said control device defines a first lever of the linkage system; said first lower, elongated link includes a second lever of the linkage system; said second link defines a push-pull rod connecting a pivot of the first lever to the rear end of the second lever; said cutter carrier defines a third lever, said third lever having a lower front section and a rear upper section; said lower front section is rotationally connected to said second lever via a pivot located between said front wheel and said rear end of said second lever, and the upper end of said upper section of said third lever is connected to a sleeve/shaft, the center of which defines the axis of rotation of said first lever defined by the control device.

2. The cutting trolley of claim 1, wherein said control device is provided with a handle located adjacent to a handle for moving the trolley.

3. The cutting trolley of claim 1, wherein the axis of rotation of the rear wheels define the turning axis of the cutting carrier, which defines said third lever.

4. The cutting trolley of claim 1, wherein a bearing housing for journaling a wheel shaft of the rear wheels is provided on the cutter carrier in the region of a bend of said third lever, defined by the cutter carrier.

5. The cutting trolley of claim 1, wherein said first link of the frame structure is approximately horizontal, said second link of the frame structure is approximately horizontal, and the front lower section and the rear upper section of the cutter carrier are approximately parallel with said first link and said second link, respectively in at least one position of the cutter carrier.

6. The cutting trolley of claim 5, wherein the at least one position is an upraised position.

7. The cutting trolley of claim 1, wherein said first link of the frame structure forms a small angle with the horizontal, said second link of the frame structure forms a small angle with the vertical, and the front lower section and the rear upper section of the cutter carrier are approximately parallel with said first link and said second link, respectively in at least one position of the cutter carrier.

8. The cutting trolley of claim 7, wherein the at least one position is an upraised position.

9. The cutting trolley of claim 1, wherein the wheel shaft is steerable.

10. A cutting trolley with a frame structure comprising:
at least two rear wheels on at least one rear shaft;
at least one front wheel;
a cutter carrier, said cutter carrier including a front attachment device and a rear attachment device for the attachment of a cutter on the carrier via a front handle and a rear handle of the cutter;
said frame structure including
- a first lower, elongated link, wherein said at least one front wheel being mounted in a front end of said first link;
- a second rear link which is rotationally connected to a rear end of said first link, said second link extending from said lower end up to a control device for adjusting the sawing depth of the cutting blade, wherein said control device being positioned at a higher level than the cutter carrier;
a bearing housing for journaling a wheel shaft of the rear wheels is provided on the cutter carrier in the region of a bend of said third lever, defined by the cutter carrier.

11. A cutting trolley with a frame structure comprising:
at least two rear wheels on at least one rear shaft;
at least one front wheel;
a cutter carrier, said cutter carrier including a front attachment device and a rear attachment device for the attachment of a cutter on the carrier via a front handle and a rear handle of the cutter;
said frame structure including
- a first lower, elongated link, wherein said at least one front wheel being mounted in a front end of said first link;
- a second rear link which is rotationally connected to a rear end of said first link, said second link extending from said lower end up to a control device for adjusting the sawing depth of the cutting blade, wherein said control device being positioned at a higher level than the cutter carrier;
- said first link of the frame structure is approximately horizontal, said second link of the frame structure is approximately horizontal, and the front lower section and the rear upper section of the cutter carrier are approximately parallel with said first link and said second link, respectively in at least one position of the cutter carrier.

12. A cutting trolley with a frame structure comprising:
at least two rear wheels on at least one rear shaft;
at least one front wheel;
a cutter carrier, said cutter carrier including a front attachment device and a rear attachment device for the attachment of a cutter on the carrier via a front handle and a rear handle of the cutter;
said frame structure including
- a first lower, elongated link, wherein said at least one front wheel being mounted in a front end of said first link;
- a second rear link which is rotationally connected to a rear end of said first link, said second link extending from said lower end up to a control device for adjusting the sawing depth of the cutting blade, wherein said control device being positioned at a higher level than the cutter carrier;
- said first link of the frame structure forms a small angle with the horizontal, said second link of the frame structure forms a small angle with the vertical, and the front lower section and the rear upper section of the cutter carrier are approximately parallel with said first link and said second link, respectively in at least one position of the cutter carrier.

* * * * *